United States Patent [19]
Hamilton

[11] 3,847,530
[45] Nov. 12, 1974

[54] IMPROVED EXTRUSION DIE PLATE
[75] Inventor: William F. Hamilton, Houston, Tex.
[73] Assignee: Mallay Corporation
[22] Filed: July 19, 1973
[21] Appl. No.: 380,726

[52] U.S. Cl................. 425/461, 425/382, 425/379
[51] Int. Cl............................................... B29f 3/04
[58] Field of Search .......... 425/314, 382, 464, 461, 425/379; 264/142

[56] References Cited
UNITED STATES PATENTS

| 3,271,822 | 9/1966 | Rhino | 425/461 |
| 3,427,685 | 2/1969 | Gove et al. | 425/314 X |
| 3,452,394 | 7/1969 | McNeal, Jr. | 425/379 |
| 3,599,285 | 8/1971 | Hamilton | 425/307 |
| 3,599,286 | 8/1971 | Karet | 425/464 |

*Primary Examiner*—R. Spencer Annear
*Attorney, Agent, or Firm*—Pravel & Wilson

[57] ABSTRACT

An improved extrusion die plate including a die plate discharge face having nozzle portions, radially directed, wear-resistant strips and a facing material cooperating to provide a planar discharge surface.

11 Claims, 6 Drawing Figures

IMPROVED EXTRUSION DIE PLATE

BACKGROUND OF THE INVENTION

The field of this invention is the pelletizing of extruded plastics.

The production of pellets of plastics such as polyethylene and polypropylene by means of pelletizing machines is known. In U.S. Pat. No. 3,599,285, issued to this inventor, a standard pelletizing machine is disclosed. Such a standard pelletizing machine converts a plastic feedstock from granular form into a molten state and extrudes the molten plastic outwardly through a die plate. A rotating cutting assembly is mounted at the discharge side of the die plate to continuously sever the extruded molten plastic into pellets. One of the problems in using such a pelletizing machine has been the tendency of the extrusion die plate to fail under the influence of heat and the rotating cutter assembly.

The prior U.S. Pat. No. 3,599,285 of this inventor is directed to a die plate designed for a longer operating life in such a pelletizing machine.

SUMMARY OF THE INVENTION

It is an object of this invention to provide a new and improved extrusion die plate that is particularly resistant to wear and to failure from high operating temperatures and high stresses exerted on and by the die plate. In the preferred embodiment of this invention, the extrusion die plate includes a die plate body having a plurality of sets of radially aligned extrusion passageways angularly spaced about the die plate body for passing outwardly a flowable plastic material into engagement with a rotating knife blade assembly, the rotating knife blade assembly cutting or sectioning the extruded material into pellet-size particles in a well-known manner. The extrusion passageways positioned in the die plate body extend through the die plate body and terminate in nozzle portions on the discharge side of the die plates; the nozzle portions of the passageways actually protrude from a recessed die plate face. A plurality of strips of wear-resistant material such as tungsten-carbide or other suitable material are mounted in the recessed die plate face between the sets of radially aligned passageways for the purpose of increasing the operating life of the extrusion die plate. And, a facing material of ceramic or other suitable material of sufficient hardness is positioned on the recessed die plate face in order to cooperate with the radially directed strips and the nozzle portions to provide a planar discharge surface which is capable of withstanding exposure to the rotating knife blades which cut the extruded material into pellet-size particles.

The strips or bars of wear-resistant material are mounted in the die plate body in grooves which serve to receive and at least partially concentrate stresses otherwise applied to the facing material thereby minimizing the stresses applied to the facing material and increasing the life thereof.

DESCRIPTION OF THE PREFERRED EMBODIMENT

Figure 5:
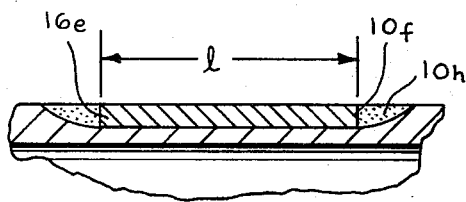
FIG. 5 is a sectional view taken along line 5—5 of FIG. 2 of one of the wear-resistant strips of this invention.

Referring to the drawings, the letter D generally designates the new and improved extrusion die plate of the preferred embodiment of this invention. The extrusion die plate D is adapted for mounting and use with a plastic processing and pelletizing machine such as disclosed in U.S. Pat. No. 3,599,285 issued to this same inventor. Such a pelletizing machine is well known in the art and does not form a part of this invention. However, for the purposes of explanation only, a few comments of description will be made of such a pelletizing machine. Such a pelletizing machine as described in U.S. Pat. No. 3,599,285 is adapted to receive a feed stock for a plastic material such as polyethylene in a granulated form and to convert such feed stock into a flowable, extrudable material which is extruded through a die plate such as the die plate D of the preferred embodiment of this invention. Such a pelletizing machine includes a hopper portion adapted to receive the granular plastic feed stock and a heating chamber wherein the granulated plastic feed stock is converted into an extrudable material which is passed into a heated chamber and extruded outwardly therefrom through a die plate such as the die plate D of this invention. A cutter knife assembly is mounted on the discharge side of the die plate such as the die plate D of this invention for continuously cutting the material extruded through the die plate such as D into pellet-sized particles. Such a knife cutting assembly is disclosed in FIG. 5 of U.S. Pat. No. 3,599,285 as including a series of knives angularly spaced apart from a center shaft for rotation substantially against a die plate such as D for sectioning the extruded material.

Referring now to the die plate D of the preferred embodiment of this invention, the die plate D basically includes a body generally designated by the number 10. The body 10 includes a discharge side 10a and an inlet side 10b. Of course, the discharge side 10a and the inlet side 10b designations refer to the path of extrudable material through the die plate D. The die plate body 10 includes a series of circumferentially spaced bolt holes 10c machined through an outer ring area 10d on the discharge side 10a of the die plate body 10. Further, a series of bolt holes 10e are machined in a circle which may be defined as an inner ring 10f when referring to the discharge side 10a of the body 10. A center circular recess 10g is machined in the discharge side 10a. The outer ring of bolt holes 10c and the inner ring of bolt holes 10e, as well as the center, circular recess 10g all serve to provide mounting for the die plate body 10 itself and for equipment such as the cutter blade assembly to be mounted thereagainst. Referring again to the discharge body side 10a, the annular surface area positioned between the inner ring of bolt holes 10f and the outer ring of bolt holes 10c may be defined as the discharge die surface designated by the letter S.

Figure 1:
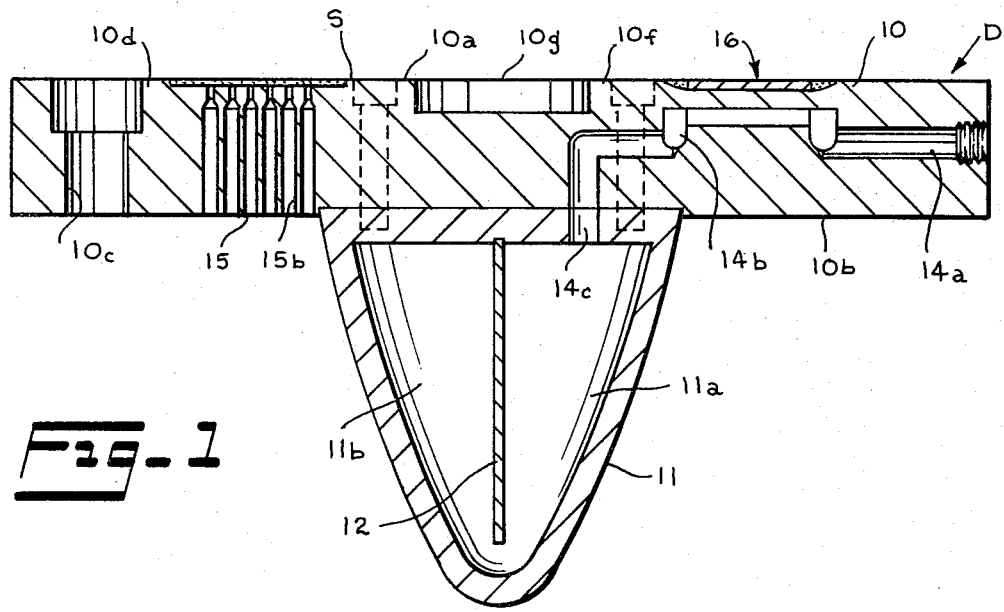
FIG. 1 is a cross-sectional view of the extrusion die plate having the improved discharge die surface of the preferred embodiment of this invention.

A conical deflector 11 is mounted at the center of the inlet side 10b of the die plate body 10. A baffle plate 12 is positioned on the inside of the conical deflector 11 in order to divide the conical deflector 11 into chambers 11a and 11b in a known manner. A series of bores provide communication between the chambers 11a and 11b of the conical deflector 11 and the outside of the die plate body 10. The bore arrangement illustrated in FIG. 1 of this application is identical to the bore arrangement illustrated for the die plate of U.S. Pat. No. 3,599,285 and thus generally includes an inlet channel 14a, an inner annular groove 14b and a rear port 14c which is in actual fluid communication with conical chamber 11a. In this manner, steam may be passed through the bores 14a–14c and into the conical chamber portions 11a and 11b in order to provide heat to maintain the flowable state of the plastic material being extruded through the die plate body 10.

Actual extrusion occurs through a plurality of sets 15 of radially aligned extrusion passageways individually designated as 15a which extends entirely through the die plate body 10 from the inlet side 10b to the discharge side 10a. In each set 15 of extrusion passageways, each individual passageway 15a is radially aligned with each other. Specifically, each individual extrusion passageway 15a includes an extrusion inlet bore 15b, a frusto-conically shaped, tapered bore portion 15c and a discharge bore passage 15d which terminates on the discharge side 10a of the die plate body 10. The discharge bore portion 15d actually terminates in an annular ring or raised nozzle portion 15e. The raised nozzle portion 15e includes a circular, bevelled side portion 15f which terminates at the discharge bore 15d. The raised nozzle portions 15e protrude from an annular, recessed discharge face 10h in the die plate body 10.

Figure 3:
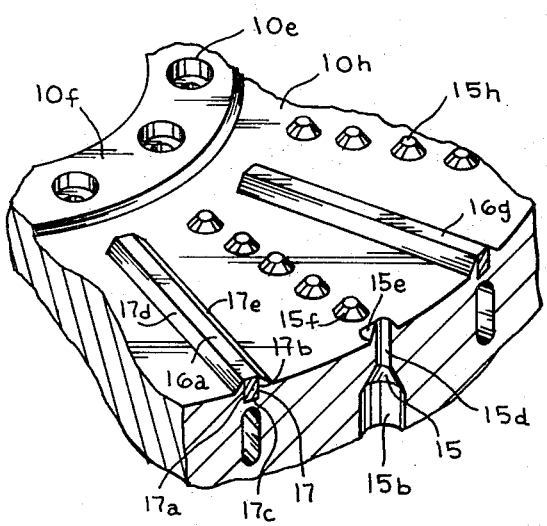
FIG. 3 is an isometric view partly in section of the recessed die face, nozzle portions and radially directed strips of this invention.
Figure 4:
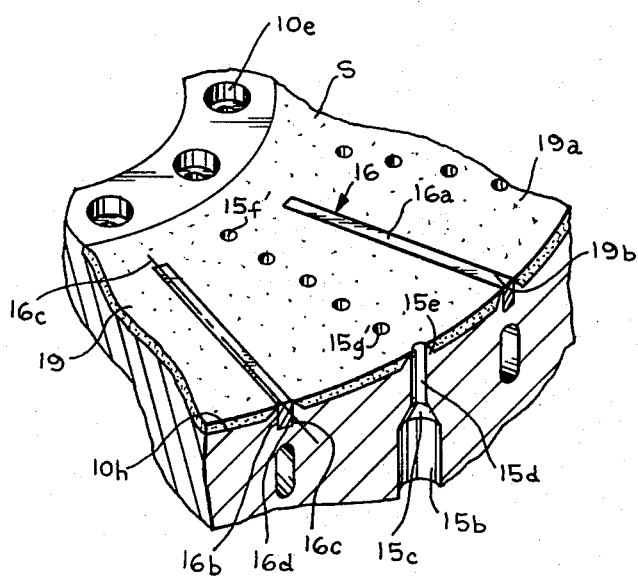
FIG. 4 is a view similar to FIG. 3 with the facing material applied over the recessed, die plate face.
Figure 6:
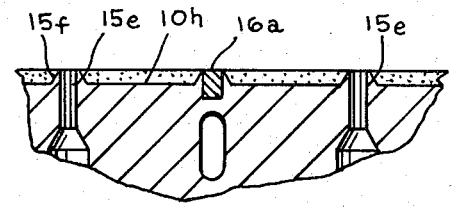
FIG. 6 is a sectional view taken along line 6—6 of FIG. 2 illustrating the angular spacing between a radially directed strip and passageway in adjacent sets of the radially directed passageways.

A plurality of wear-resistant strips generally designated by the number 16 are mounted in the recessed discharge face 10h for receiving and dissipating at least a portion of the stresses exerted on, against and by the die body 10, itself in order to increase the operating life of the die plate D. Each of the wear-resistant strips 16 comprises an elongated strip or bar 16a which is rectangular in cross-section as illustrated in FIG. 6. The elongated strip 16a is made of an extremely wear-resistant material which is capable of withstanding wear imposed by a cutter blade assembly such as previously mentioned. The strips 16a may be made of any such suitably wear-resistant material such as tungsten-carbide or other suitably hard material having excellent wearing characteristics such as a hardened material of ferrous content, so long as such metal is harder than the metal of the main die plate body 10. The longitudinal axis 16b of each of the wear-resistant strips extends radially outwardly from the center of the die plate body 10. The strips 16a are angularly spaced about the discharge surface S in the recessed discharge face 10h such that a strip 16a is interposed or positioned between adjacent sets 15 of the radially aligned passageways 15a. Each of the strips 16a is mounted in a radially extending notch or groove 17 which is machined in the discharge side 10a of the die plate body 10. Each of the grooves 17 is U-shaped in cross-section as illustrated in FIGS. 3, 4 and 6 and includes side walls 17a and 17b and a bottom 17c. The side walls 17a and 17b of each radially directed groove extend upwardly to bevelled, side edges 17d and 17e, respectively. The bevelled side edges 17d and 17e are raised from the recessed die plate face 10h and extend throughout the length of the groove 17 and the wear-resistant strip to be mounted therein. The wear-resistant strip 16a may be mounted in the radially directed U-shaped groove 17 by any suitable means. For example, in the preferred embodiment of this invention, the side groove walls 17a and 17b cooperate to provide a friction fit against the corresponding side walls 16b and 16c, respectively, of the strips 16a. Bottom 16d of the strip 16 may be copper brazed to the bottom 17c of the radially directed groove 17.

Figure 2:
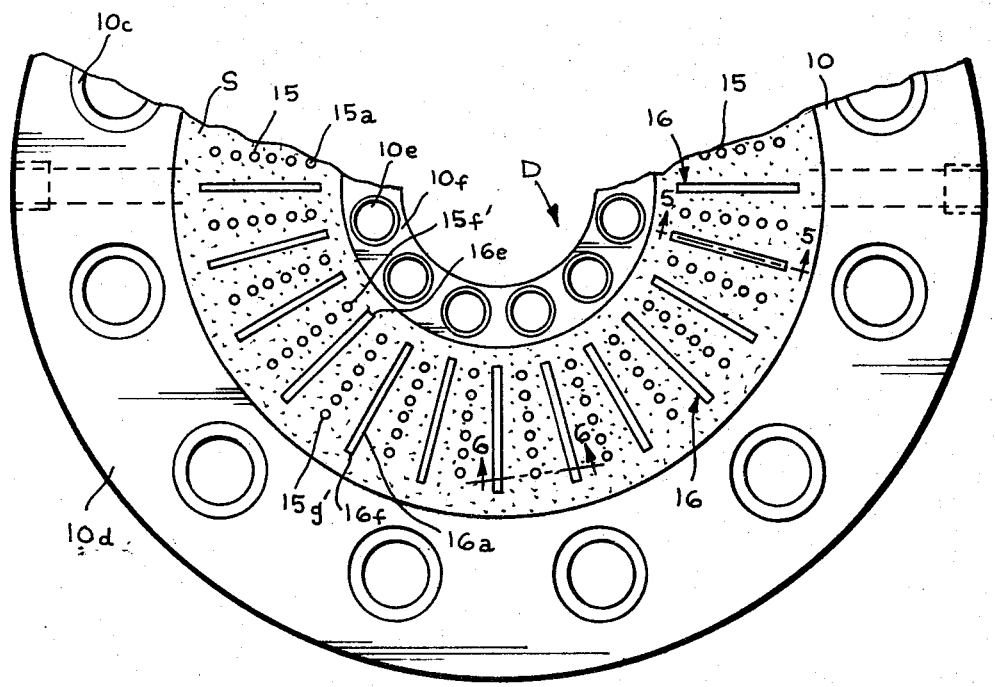
FIG. 2 is a front view taken of the discharge side of the die plate.

The length l of each of the elongated strips 16a is at least slightly greater than the distance between inner extrusion passageway 15f' and other extrusion passageway 15g' in a set 15. Referring in particular to FIG. 2, the greater length l of the strips 16a as opposed to the overall radial length or distance from passageway 15f' to passageway 15g' of each set 15 of extrusion passageways allow the positioning of the strips 16a such that each strip extends radially inwardly and radially outwardly of each set 15 of passageways. End 16e of each strip 16a is positioned or extends radially inwardly of the innermost radially positioned passageway 15f' and, outer end 16f extends and is positioned outwardly of the outermost passageway 15g' in each set 15 of radially aligned passageways.

A facing material layer 19 is applied over the recessed die plate face 10h for increasing the wear-resistance of the discharge surface S and for enhancing the heat transfer qualities of the die plate body 10. The facing material 19, in the preferred embodiment of this invention, is a ceramic material having a hardness which is greater than the hardness of the elongated strips 16a and also greater than the hardness of the die plate body 10. It should be understood that suitable materials other than ceramic may be utilized if desired, the criterion being that the facing material be harder than the elongated strips 16a. In the preferred embodiment of this invention, the facing material 10 of ceramic is flame-sprayed onto the recessed die plate face 10h. The ceramic facing material 19 is then milled or otherwise machined such that the top surface 19a is in the same plane with top surface 16g of the elongated strips 16a and with the top rims 15h of the bevelled, raised nozzle portions 15e. In this manner, the facing material 19 of ceramic cooperates with the radially directed elongated wear-resistant strips 16a and the nozzle portions 15e to provide a single, planar discharge surface S which is extremely wear-resistant under operating conditions.

The facing material 19 may be defined as having rectangular openings 19b to receive the elongated strips 16a. Thus, the ceramic facing material 19 actually surrounds both sides 16b and 16c and both ends 16e and 16f of each wear-resistant elongated strip 16a.

In the manufacture of the extrusion die plate D of the preferred embodiment of this invention, the radially directed grooves 17 are machined into the die plate body 10 in the radially directed position illustrated in FIG. 2. The tungsten-carbide elongated strips 16a are then fitted in the radially directed grooves 17 as previously described. The recessed die plate face 10h is then formed by milling the die plate body 10 until only the bevelled side edges 17d and 17e adjacent the elongated strips 16a and the raised nozzle portions 15e remain protruding from the milled, annular surface 10h. The ceramic facing material 19 is then flame-sprayed into the recessed area and the surface 19a is ground or otherwise milled until a smooth, continuous discharge surface S remains.

Many of the present general designs for die plates for use in the extrusion of a plastic material do not perform very well under operating conditions. One of the reasons is that the knife cutting assembly previously described tends to cause uneven wear and vibration on the discharge side of the die plates. Even in the case of die plates having ceramic layers on the discharge side, the heat and pressure that the die plates are subjected to may tend to cause a deflection in the ceramic facing materials thereby causing cracks and other failures, including catches on the knives of the cutter knife assemblies, which eventually destroy the discharge face or surface on the die plate. The die plate D of the preferred embodiment of this invention has a new and improved die plate surface S on the discharge side 10a thereof, which is adapted to have a longer and more effective operating life than many of the die plates now known in the art. The arrangement of a plurality of radially directed, elongated tungsten-carbide strips 16a between each of the radially directed sets 15 of extrusion passageways serve to relieve some of the stress ordinarily received by the ceramic facing material 19. The radially directed grooves 17 serve to receive and concentrate some of the stresses exerted in the die plate body 10 such that the stresses are directed against the grooves 17 and against the tungsten-carbide elongated strips 16a mounted therein. In this manner, the elongated strips 16a serve to receive and defer some of the stresses ordinarily received by the ceramic facing material 19, thereby at least partly preventing the transfer of stresses to the ceramic face 19. This concentrating of stresses at the radially directed grooves 17 and the elongated, tungsten-carbide radially positioned strips 16a serves to minimize the stresses acting against the ceramic facing material 19 thereby increasing the life of the ceramic facing material 19 and thus of the die plate D.

While specific materials have been disclosed for the various materials utilized herein, it should be understood that such specific materials are disclosed for the purpose of teaching those skilled in the art how to make and use the invention rather than disclosed as a limitation to be placed on the invention. The elongated strips 16a have been disclosed as being a tungsten-carbide material. However, it should be understood that the strips 16a may be made of any suitable material as long as it is sufficiently wear-resistant and harder than the die body 10, itself, to be operable for extremely long periods. Further, the facing material 19 has been disclosed as being ceramic; such facing material may be ceramic or any other suitable material which is harder than the die plate 10 and the wear-resistant strips 16a in order to provide an extremely tough, wear-resistant discharge surface S for the die plate D.

The foregoing disclosure and description of the invention are illustrated and explanatory thereof, and various changes in the size, shape, and materials as well as in the details of the illustrated construction may be made without departing from the spirit of the invention.

I claim:

1. An extrusion die plate for use in a pelletizing machine for extruding flowable material outwardly where such extruded material is sectioned by rotating knife blades, comprising:
   a die plate body having sets of extrusion passageways angularly spaced about said die plate body for passing such flowable material outwardly into engagement with the rotating knife blades;
   said die plate body including a die plate face on the discharge side thereof;
   said extrusion passageways extending through said die plate body and terminating in nozzle portions protruding from said die plate face such that said die plate face is recessed around said nozzle portions;
   a facing material of greater hardness than said die plate body being positioned on said die plate face; and
   strips of wear-resistant material mounted with said die plate face between said sets of passageways for increasing the operating life of said extrusion die plate.

2. The structure set forth in claim 1, wherein:
   said passageways in said sets of extrusion passageways are radially aligned.

3. The structure set forth in claim 2, including:
   said strips of wear-resistant material being radially positioned between said radially aligned passageways.

4. The structure set forth in claim 1, including:
   said facing material being positioned about said wear-resistant strips.

5. The structure set forth in claim 4, including:
   said facing material being positioned about both sides and both ends of said wear-resistant strips.

6. The structure set forth in claim 1, wherein:
   said nozzle portions, said facing material and said wear-resistant strips cooperate to provide a plane of discharge for said extruded material.

7. The structure set forth in claim 1, including:
   said die plate having radially directed grooves in said die plate face; and
   said wear-resistant strips are mounted in said radially directed grooves.

8. The structure set forth in claim 2, wherein:
   the length of said wear-resistant strips is greater than the length of said sets of radially aligned extrusion passageways.

9. The structure set forth in claim 1, wherein:
   said wear-resistant material mounted in said die face cooperates with said facing material to provide means for minimizing stresses acting on said facing material thereby increasing the working life of said die plate.

10. The structure set forth in claim 1, wherein:
    said wear-resistant material mounted in said die plate face provides means for at least partly preventing the transfer of stress exerted by said die plate body.

11. The structure set forth in claim 3, including:
    said strips of wear-resistant material extend radially inwardly and outwardly of said extrusion passageways sets.

* * * * *